Aug. 11, 1953     W. WOCKENFUSS     2,648,277
CARD CONTROLLED WIRE PRINTING AND FEEDING MEANS
Filed Dec. 23, 1948     10 Sheets-Sheet 1

Fig.1

INVENTOR.
William Wockenfuss,
BY
ATTORNEY.

INVENTOR.
William Wockenfuss,
BY
ATTORNEY.

Patented Aug. 11, 1953

2,648,277

UNITED STATES PATENT OFFICE 2,648,277

CARD CONTROLLED WIRE PRINTING AND FEEDING MEANS

William Wockenfuss, Union, N. J., assignor, by mesne assignments, to Burroughs Adding Machine Company, a corporation of Michigan Application December 23, 1948, Serial No. 66,904

9 Claims. (Cl. 101—2)

This invention relates to improvements in the art of printing and has particular reference to an addressing machine which, besides other uses, has special application to the mailing of periodicals and the like by publishers or other distributors.

In the distribution of periodicals, it has been customary practice to utilize stencil plates to print dick strips for each issue of a publication, which strips are then applied to subscribers' copies before mailing. It has also been usual, upon the approach of the expiration date of a subscription, to mail a renewal notice and, so far as known, the printing of addresses for such renewal notices has been a separate operation from that of printing the subscribers' addresses for application to the publication issues.

The present invention contemplates a machine wherein the use of stencil plates in the printing of addresses is eliminated and is controlled from an information source such as a punched card, and in which provision is made for printing an address periodically and for duplicating the operation of printing said address aperiodically, as when a renewal notice is to be sent, and for rejecting for any future use the information source of a particular subscriber after his address has been printed for the last issue of his subscription.

In my co-pending application Serial No. 35,307 filed June 26, 1948, there is disclosed a printing machine comprising a print section consisting of a multiplicity of printing heads arranged in rows each representing a line of printing, and each head comprising a plurality of selectively operable printing elements capable, by their selection, of printing any numerical or alphabetical character and all said heads being actuated to simultaneously print a number of lines equal to the number of rows in said print section.

According to one of the features of the present invention, it is proposed to utilize two or more such print sections as above referred to, each of which is capable of printing upon a separate dick strip or other impression-receiving surface a subscriber's name and address and other similar data taken from an information source, and one of which sections is selectively operable to print simultaneously with the other section only when a renewal notice or the like is to be transmitted to the subscriber.

Another feature of the invention is to control a run of subscribers' cards through the machine so that those subscribers' cards whose subscriptions expire with a current issue will have their addresses printed by only one of the print sections of the machine, after which said cards will be automatically segregated or sorted from the remaining cards in said run so as not to be available when printing addresses for a subsequent issue.

A further feature is to control the automatic and simultaneous printing of duplicate addresses and the sorting out of cards representing expiring subscriptions, by means of manually settable switch devices which, after being set, automatically effect comparison between dates set up therein and those punched in said cards.

The inventive idea involved is capable of receiving a variety of expressions one of which, for purposes of illustration, is shown in the accompanying drawings; but it is to be expressly understood that said drawings are employed merely to facilitate the description of the invention as a whole and not to define the limits thereof, reference being had to the appended claims for this purpose.

In the drawings:

Figs. 9 to 15, when arranged end to end, illustrate diagrammatically the circuits involved in the control of a printing head in each of the two print sections.

Figure 1:
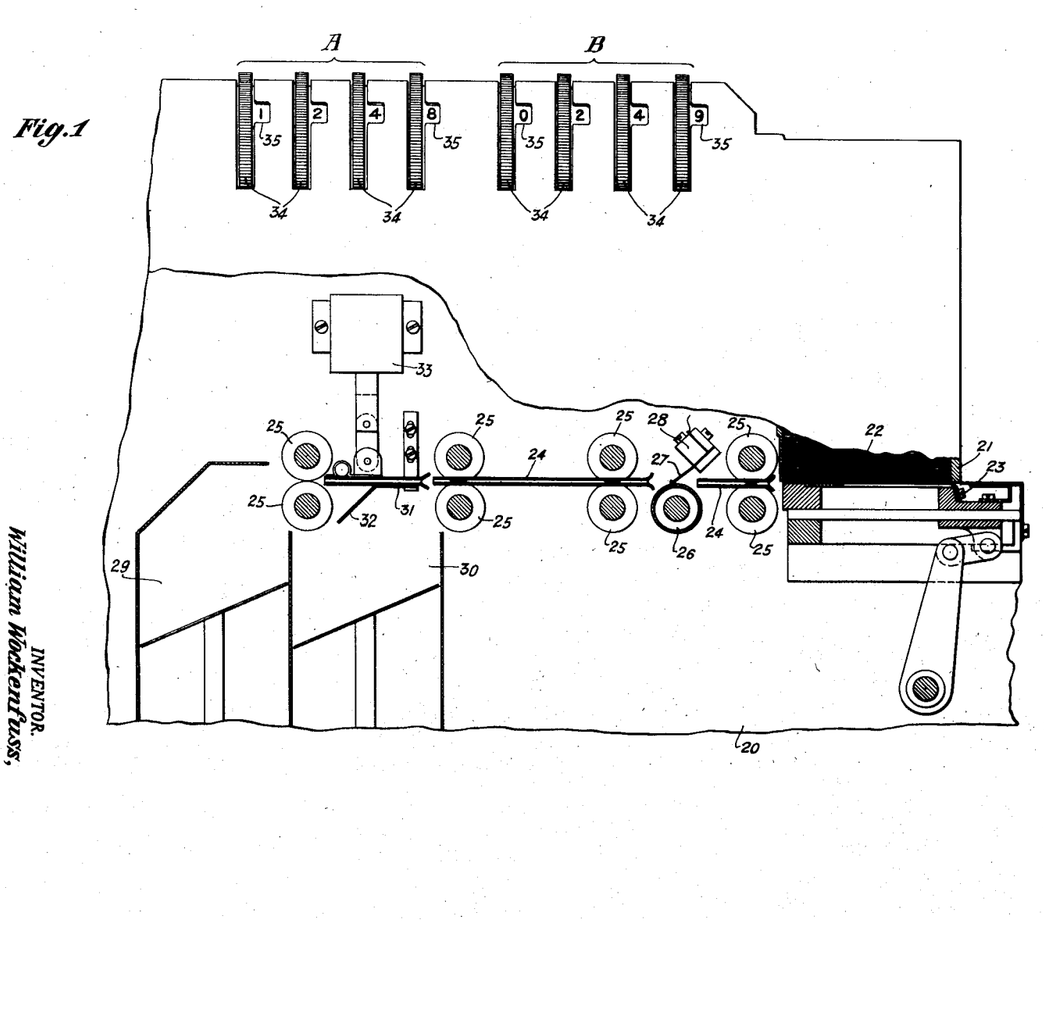
Fig. 1 is a fragmentary side elevation, partly broken away and shown in section, of an addressing machine constructed in accordance with the invention.

The machine structure may be of the form shown in Fig. 1 wherein the numeral 20 indicates, generally, the machine casing in which is mounted a card feed magazine 21 wherefrom cards 22 are fed by a picker mechanism 23 so as to pass through guides 24 and between sets of feed rollers 25. At an intermediate point in the passage of each card, it moves over an electrical contact roller 26 and is sensed for perforations therein by a set of brushes 27 of an analyzing mechanism 28, which brushes make contact with the roller 26 when a hole is sensed, there being a brush for each column of the card. The structure thus far described and conventionally shown is well known in such machines as punched card sorters and tabulators. Also well known in sorting machines are pockets into which cards are deposited in accordance with their analysis and, in the present machine, two such pockets 29 and 30 are employed which, for purposes of this description, may be termed, respectively, the receiving and reject pockets. The use of cards illustrates one practical adaptation of the invention but it will be understood, of course, that other record sources may be employed without departing from the spirit or scope of the invention and the term "cards" herein is to be construed as including other known means which may be employed for the recording and transmission of information.

Figure 8:
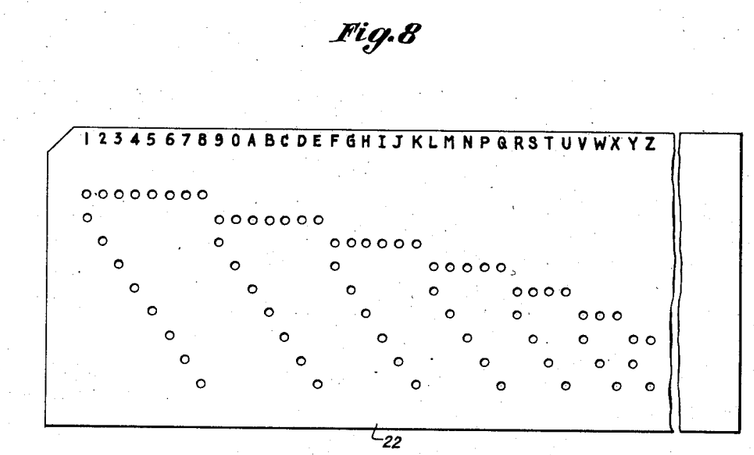
Fig. 8 is a plan view of a card such as may be employed in the present machine and illustrating thereon a two-hole combinational code utilized in the punching of expiration dates, addresses and other data in subscribers' cards.

In carrying out the purposes of the present machine, it is contemplated that each card 22 have one field assigned to the punching of the expiration date of a subscription to a periodical or the like, and the remaining field or fields to the name and address of a subscriber and other suitable identifying data. For the first field, only four columns are required for punching therein the numbers representing the month and the last two digits of the year, and consequently four of the brushes 27 are assigned for sensing the holes punched in said columns. Fig. 8 shows a card 22 such as employed in the tabulating art and therein is illustrated a two-hole combinational code with indicia at the head of each column identifying the numerical or alphabetical character represented by the punchings in said column, the code for the numeral and letter "O" being the same.

According to the present invention, each time a card is analyzed, provision is made for printing the subscriber's name and address on one dick strip or other impression-receiving surface, and for comparing the date punched in said card with previously set up dates in a pair of manually operable devices A and B (Fig. 1) or other like control means. The device A has the date of the current issue of a periodical set up therein and the device B has a date set up subsequent to said current issue date, the later date representing the expiration date of subscriptions the periodicals for which are being currently distributed. The device B is designed to control the printing of the subscriber's name and address upon a second dick strip or other surface, such as an envelope, simultaneously with the printing of the first disk strip when the date set up in said device compares with the expiration date punched in a card being analyzed, and said card will thereafter be discharged through the adjustable guide 31 into the receiving pocket 29 for use in the following months until the subscription expires. Said second disk strip or envelope is then employed to send a renewal notice form to the subscriber. If the date sensed in a card compares with that set up in the switching device A, indicating expiration of the subscription with the current issue, the first dick strip will, nevertheless, be printed for the distribution of said current issue to the subscriber, but the second dick strip will not be printed and said card will not be discharged into the pocket 29 but will be deflected into the reject pocket 30 by an automatic adjustment of the guide 31 carrying a deflector 32 and operated by solenoid 33 in a manner to later appear, and said card may be thereafter destroyed. Should the subscriber renew his subscription, another car is then punched with the new expiration date and other data, and is placed among the cards taken from the pocket 29 for use in the mailing of subsequent issues.

The switching devices A and B are suitably mounted in the casing 20 and each comprises four rotatable dials or ring members 34 having the numerals "0" to "9" imprinted or otherwise applied thereon so that said numerals will be visible through sight opening 35 in the casing when setting the dials to indicate a particular date. Thus, as shown in Fig. 1, the switching device A has its four dials set for 12/48 which represents the date of the current issue being prepared for mailing, and the dials of the device B are set for 02/49 which represents the date of subscriptions expiring two months after the first date and for which it is desired to mail out renewal notices. Therefore, when the date of a card being analyzed compares with the first date, said card will be rejected after the printing of one dick strip, and comparision between the date punched in another card with the date set up in device B will produce the printing of two dick strips and the deposit of said card into the pocket 29.

Figure 7:
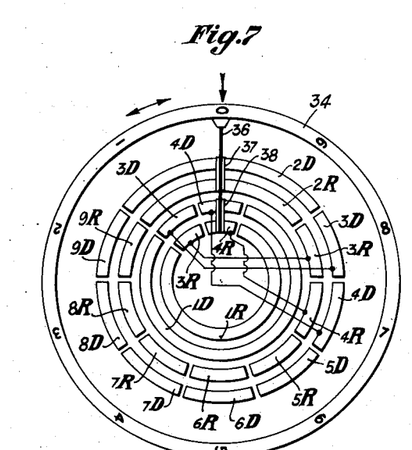
Fig. 7 is a diagrammatic view of one section of each of a plurality of manually operable switching devices utilized to effect comparison between dates set up therein and those punched in subscribers' cards.

Each of the eight dials employed in the two devices A and B carries, as diagrammatically shown in Fig. 7, an inwardly extending insulated arm 36 on which are mounted two spaced contact brushes 37 and 38 associated, respectively, with outer and inner stationary sets of concentrically arranged electrical contact segments, with each set containing two groups of segments and each of the brushes 37, 38 controlling the establishment of a circuit for one of the two digits of the combinational code shown in Fig. 8 in which each numeric or alphabetical character to be printed is represented by a two-hole combination. Thus, in presetting each of the eight dials 34 for the two dates with which the punchings in the four date columns of various cards are to be compared, each dial is rotated in either direction until the desired digit appears in the sight opening 35 for said dial. In identifying the various contact segments associated with each dial, the letter "D" is employed to designate those segments which are electrically connected to a distributor 39 (Fig. 10) serving both switching devices, while the letter "R" represents those segments which are connected to relays in the various groups shown in Figs. 9 and 10 and which will be subsequently described in detail. Thus, for setting up the numeral or letter "O" (Fig. 7), the brushes 37 and 38 will bridge, respectively, the segments 2D, 2R and 4D, 4R; setting up the numeral "1" will cause said brushes to bridge segments 2D, 2R and 1D, 1R; for the numeral "2" the brushes will bridge segments 3D, 3R and 1D, 1R, and so on; it being noted that the segments 3D, 3R, 4D and 4R are each structurally shown in two sections which are electrically connected in parallel.

For printing the two dick strips above referred to, the invention provides two interconnected print sections P and P1 (see Figs. 14 and 15), the section P being operated by the circuit of Fig. 11 each time a card is analyzed, and the section P1 being controlled, in a manner later to be described, so as to operate only when the expiration date punched in a card compares with the set-up in the switching device B. Each print section includes a plurality of printing heads 40 only one of which, and its operating circuit, is shown in each of Figs. 14 and 15, it being understood that circuits for all remaining printing heads are duplicates of the ones illustrated. It will be further understood that the invention contemplates the use of more than the two print sections herein shown and that these additional sections may be controlled from the same information source to repeat the operations of which the machine is capable.

Figures 2, 3, 4, 5, 6:
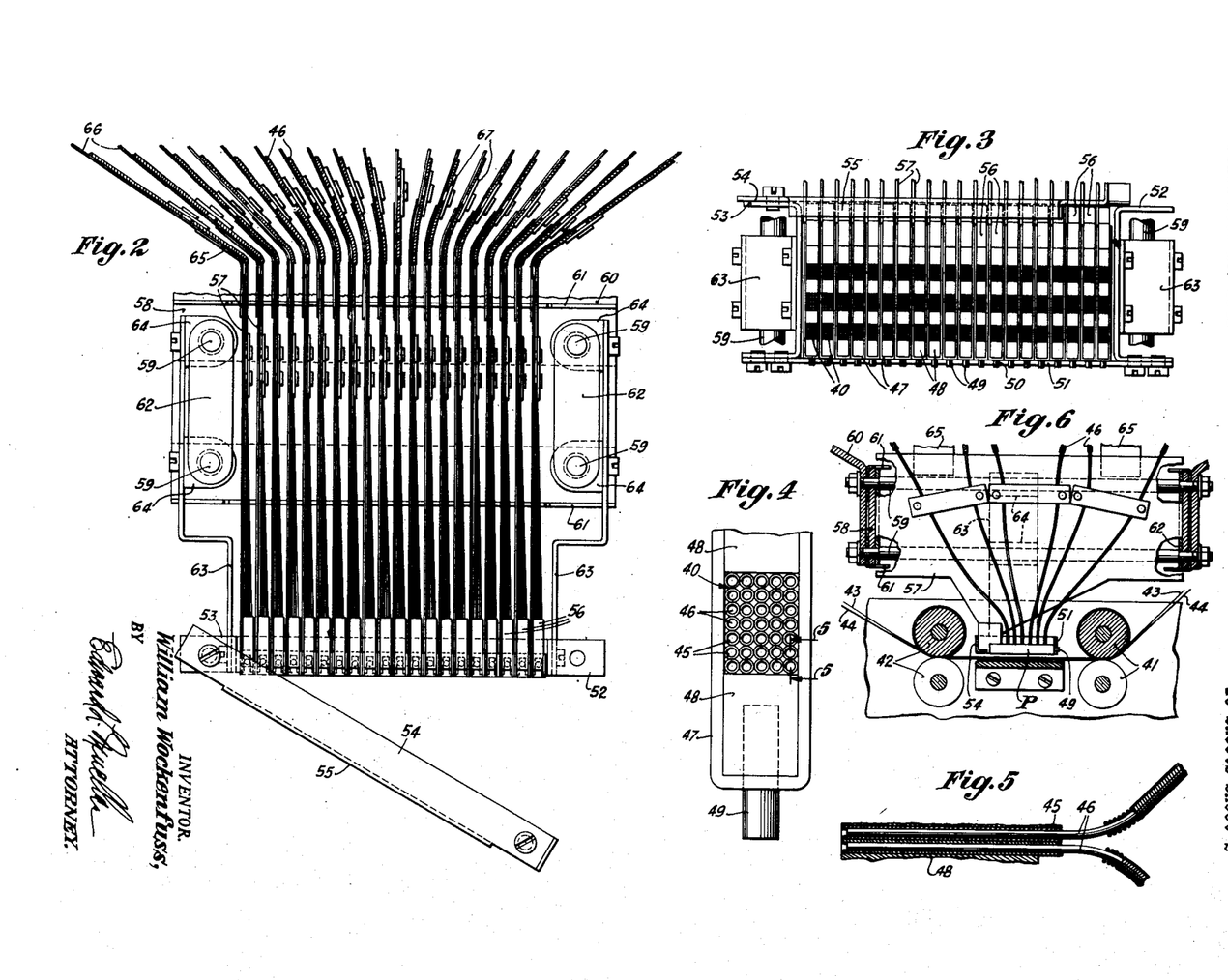
Fig. 2 is a partial elevation of one of the print sections of the machine and associated parts.
Fig. 3 is a bottom plan view of a print section.
Fig. 4 is an enlarged fragmentary elevation of one unit of the print section, showing one of the printing heads.
Fig. 5 is a section on the line 5—5 of Fig. 4.
Fig. 6 is a fragmentary sectional view illustrating schematically the manner in which a dick strip or other impression-receiving surface and a carbon strip are fed past a print section.

The construction and arrangement of the heads 40 for each print section are shown in Figs. 2 to 6 and since said sections are duplicates, a description of one of them will suffice. In Fig. 6, the print section, generally indicated at P, is disposed between two sets of feed rollers 41, 42 and passing between said rollers are the carbon and dick strips 43 and 44, respectively, which may be intermittently or continuously fed through the machine by any conventional and well known form of paper feed (not shown), and each time the heads 40 of the print section are selectively and simultaneously activated an impression will be made upon the dick strip 44 through the ribbon or carbon strip 43.

As shown in Figs. 4 and 5 and more fully described in the above mentioned pending application, each printing head 40 consists of a plurality of tubes 45 arranged compactly in rectangular formation with each tube having a printing element 46 in the form of a Bowden wire movable therein and adapted to be projected from its position in Fig. 5 to form one portion of a character so that when a plurality of wires, less than the total number in the head, are selected for operation they will combine to form the desired character; furthermore, the wires 46 of each head may be variously operated to form any numerical or alphabetical character. Fig. 3 shows sixty printing heads arranged in three rows of twenty heads each, but this arrangement may be altered to suit the desired capacity of any machine. When arranged as shown, the heads 40 are divided into groups of three with each group mounted in an elongated supporting unit 47 and uniformly spaced therein by blocks 48 so as to constitute the three rows of heads when the units 47 are assembled in their supporting frame. Each unit is provided with a pin 49 at its closed end adapted to engage in a notch 50 in the end plate 51 of the supporting frame. Secured to the extremities of said plate are the brackets 52 and 53 and to the latter there is pivoted the lock bar 54 shown in partially open position in Figs. 2 and 3 and having a flange 55 adapted to engage the shouldered filler blocks 56 disposed in the units 47, when said bar is swung closed and locked to the bracket 52, thereby to support and retain the units 47 and their printing heads in proper position. Each of the filler blocks 56 has affixed thereto a mounting plate 57 and this series of plates is supported in position by a frame consisting of two end members or plates 58 connected together by tie rods 59 extending through said plates and the lower end of the main housing 60 of the mounting plates 57. Upper and lower combs 61 are fastened to the plates 58 and receive the ends of the plate 57 to maintain the same in spaced relation, and the tie rods 59 are joined by braces 62.

The frame members 58 are supported by the angle arms 63 secured at their lower ends to the brackets 52 and 53 and provided with lugs 64 through which the tie rods 59 extend. Secured to each mounting plate 57, by means of an angle strap 65 is a panel 66 and all of these panels are arranged in upwardly diverging relation to permit of the mounting thereon, as fully described in said pending application, the multiplicity of solenoids S for the various heads 40 of the print section. The Bowden wires 46 of the various solenoids are extended downwardly therefrom to their printing heads and secured to the panels 66 by means of straps 67.

Figure 9:
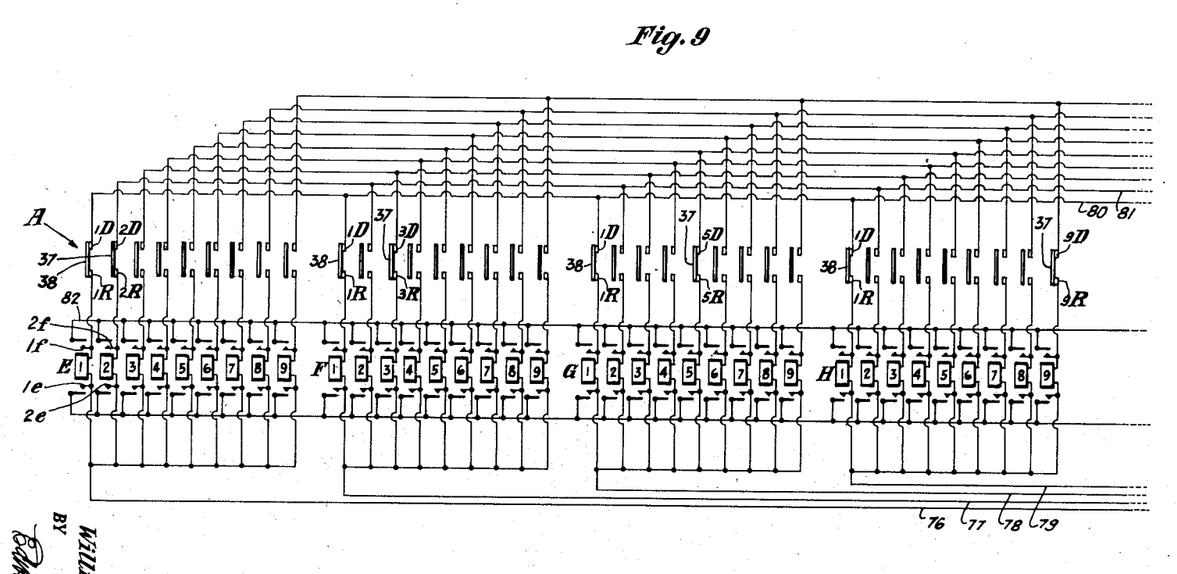

In the circuit diagram of Fig. 9, four groups of selector relays, generally indicated at E, F, G and H, are provided for the four digits of a date to be set up in the switching device A, the first group E being assigned to and controlled by the dial 34 and its brushes 37, 38 which are utilized to set up the first digit of the month of said date, the second group F being assigned to the second digit of the month, the third group G to the third digit of the year, and the fourth group H to the fourth digit of the year. Thus, for the date of December 1948 and in accordance with the combinational code of Fig. 8, the first dial 34 of device A, representing the first digit "1" of the twelfth month, is set so that the brushes 38 and 37 will, respectively, bridge the segments 1D, 1R and 2D, 2R; the second dial of said device is set so that the segments 1D, 1R and 3D, 3R are bridged for the second digit "2" of said month; the third dial is adjusted to bridge the segments 1D, 1R and 5D, 5R for the third digit "4" of the year; and the fourth dial is set to bridge segments 1D, 1R and 9D, 9R for the fourth digit "8" of said year. In the same manner which will be now clearly understood, the four dials of the device B (Fig. 10) associated with the relay groups J, K, M and N are set to cause their respective brushes 37, 38 to bridge the segments of the four digits representing a subsequent date, such as February 1949.

Figure 10:
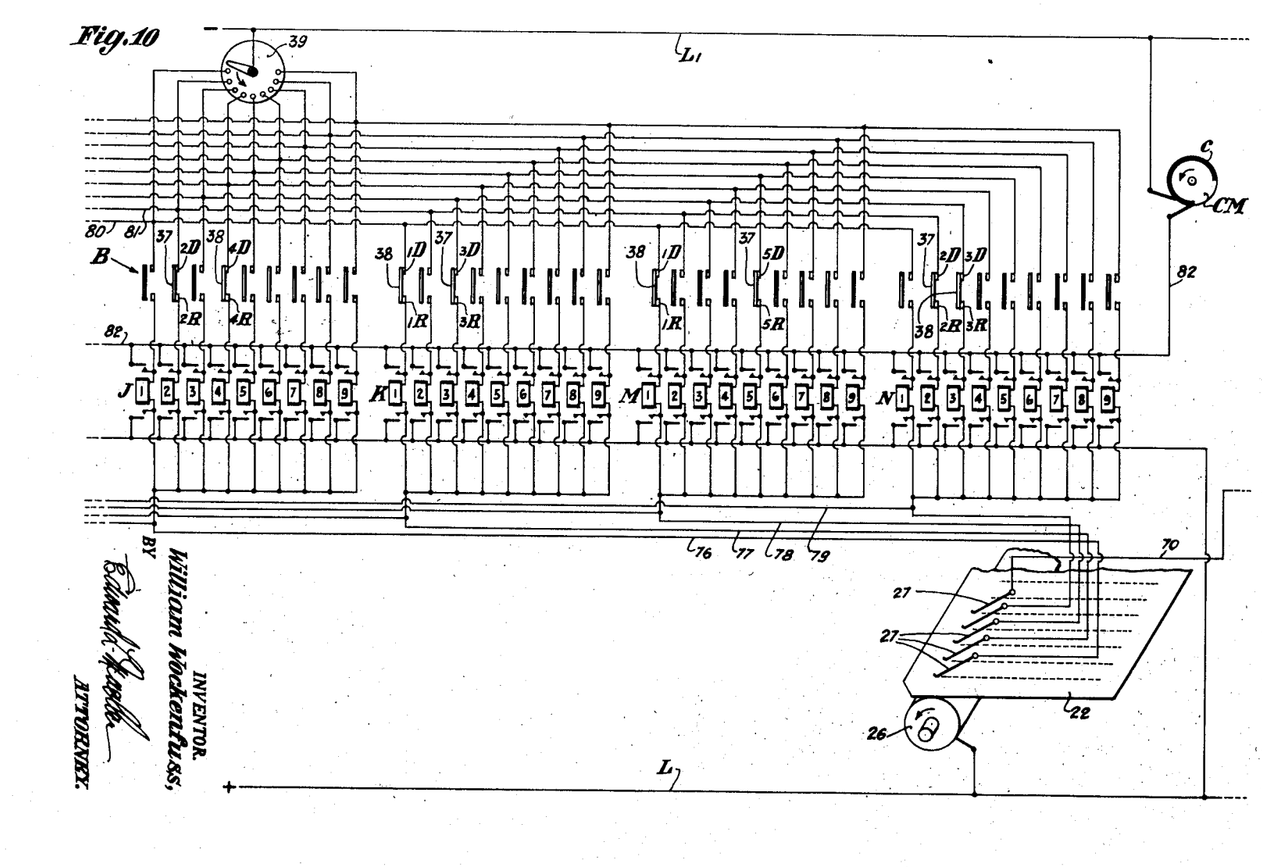

Before proceeding further to the description of the manner in which the four lowermost date brushes 27 (Fig. 10) control the circuits for the selector relay groups of Figs. 9 and 10 upon comparison of dates punched in the first four columns of cards being analyzed with the dates set up in the switching devices A and B and, by such comparison, eithher cause the switching device A to reject a card into the pocket 30 or produce, through the device B, simultaneous duplicate printing of two dick strips, the circuits by means of which one printing head 40 of the print section P will be operated each time a card is analyzed regardless of the subscription date punched therein, will be first described.

During each cycle of operation of the machine which includes the passage of a card 22 beneath the sensing brushes 27 and the operation of one or both print sections P, P1 before the next card is analyzed, the fifth and all remaining brushes will sense their respective columns in each card for punched data representing a subscriber's name, address and any other information contained in a card so as to cause the print section P to print the analyzed data, and since the operations and circuit controls originating from each of said columns are the same, only those for the fifth brush are shown and described herein.

Figure 11:
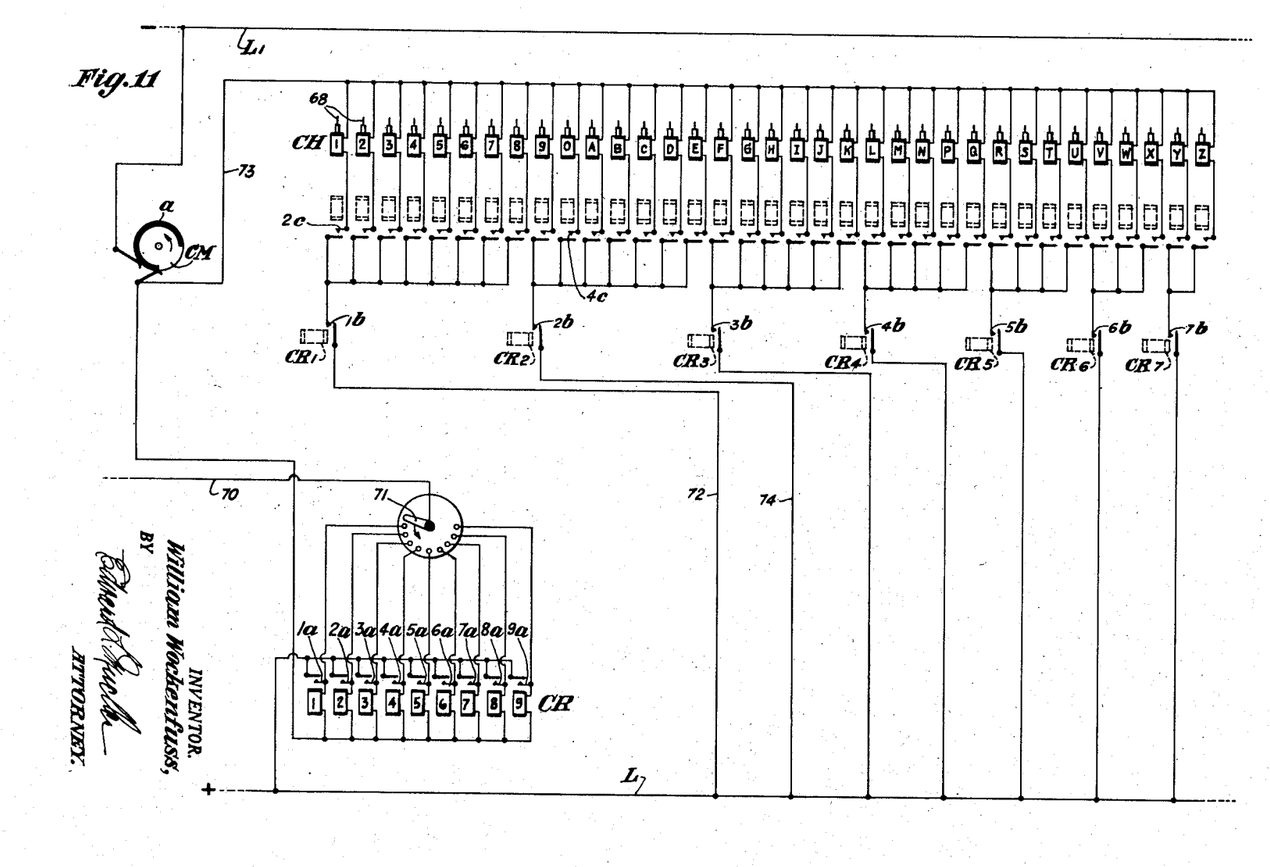
Figure 14:
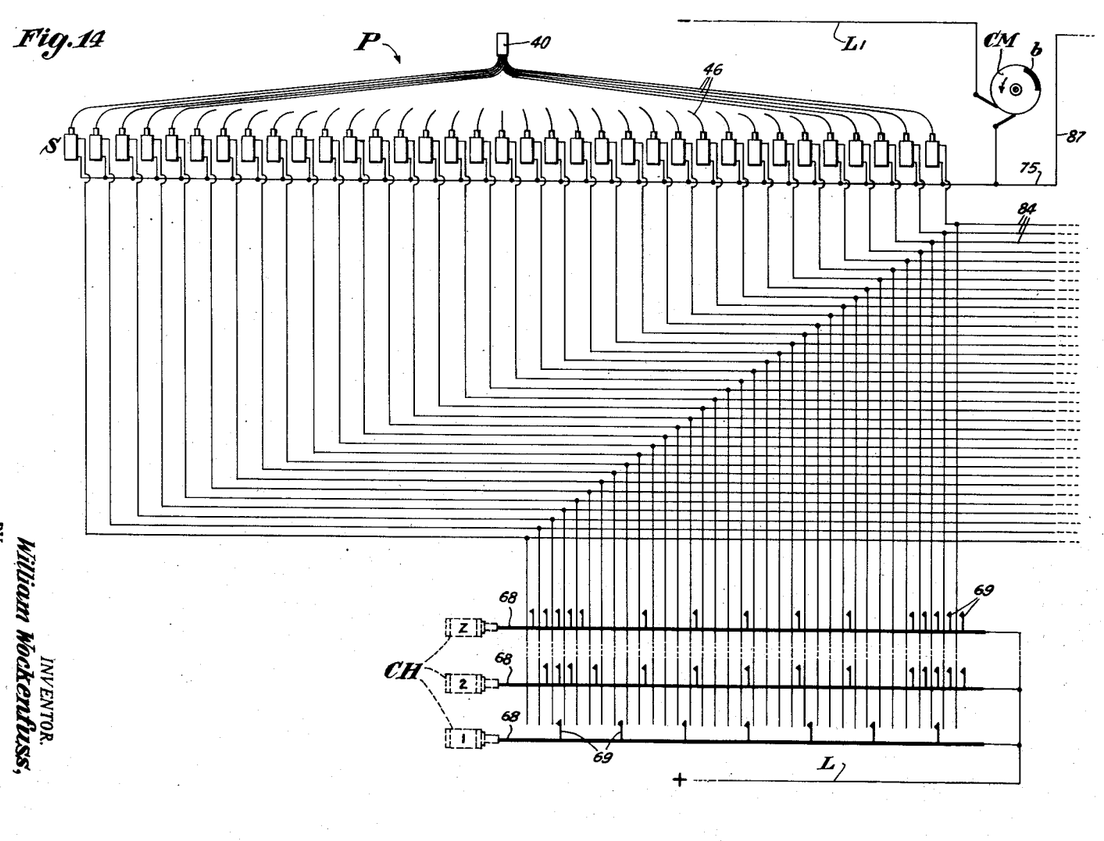
Figure 15:
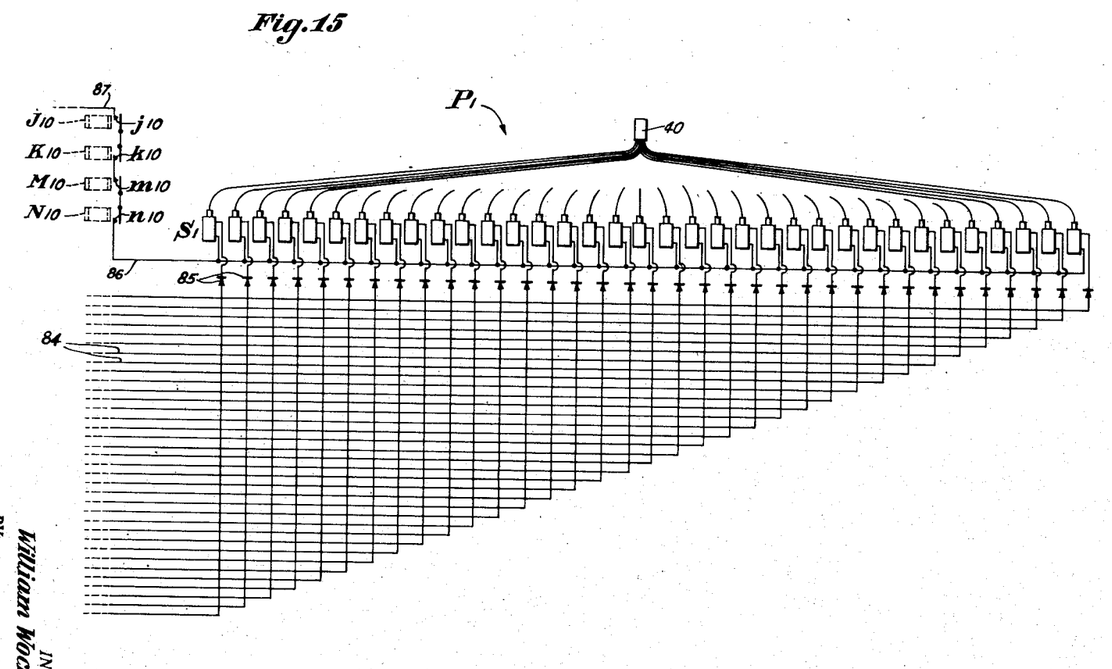
Figure 18:
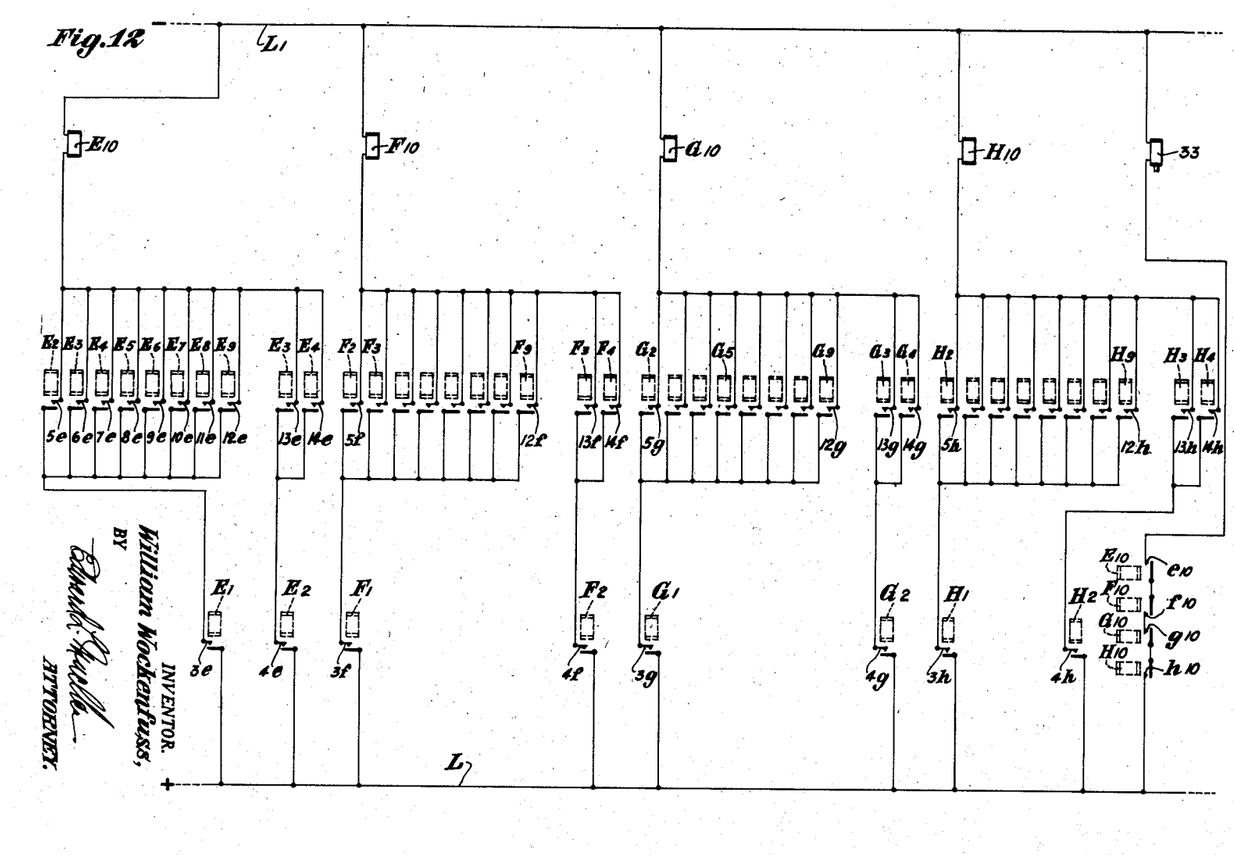

By reference to Figs. 11 and 14, it is seen that the circuits for controlling the operation of a printing head 40 of the print section P include the group of solenoids S for the thirty-five printing elements 46 of said head, each of said solenoids being assigned to one printing element. These solenoids and their printing elements are selectively operated to print a desired character, the code for which is sensed by the fifth brush 27 and such printing is under control of the character identifying solenoids CH each representing one of the digits 1 to 9 or a letter of the alphabet, as shown in Fig. 11. The solenoids identifying the digits "1" and "2" and the letter "Z" are also illustrated in dotted lines in Fig. 14, together with the bus bars 68 thereof each of which carries a plurality of contacts 69 identifying the particular character to be printed when its solenoid CH is energized, and by means of which certain of the print solenoids S corresponding to the contacts 69 are energized to project forwardly their respective printing elements 46 to form said character. Thus, reading from left to right in Fig. 14, when the solenoid CH for the digit "1" is energized, the contacts of the bus bar 68 of said solenoid will prepare circuits for the 3d, 8th, 13th, 18th, 23d, 28th and 33d solenoids S, which circuits will be closed at the conclusion of the sensing of a card in a manner which will presently appear. From this, it will be understood that the solenoids CH for the digit "2" and letter "Z" and all other like solenoids will control their respective bus bars 68 to establish circuits for various combinations of the solenoids S to print a selected character in any one of the heads 40.

A group of nine code register relays, generally indicated at CR and designated by the numerals 1 to 9, is utilized to prepare circuits for the energization of the solenoids CH under control of the fifth brush 27 (Fig. 10) and said solenoids are divided into seven zones so that the selection of a particular solenoid involves, first, the selection, by the first hole punched at any index point in the column being sensed by said brush, of the zone in which said solenoid appears and, second, the selection of the particular solenoid in said zone by the sensing of the second hole appearing in said column. The first of said zones appearing at the left of Fig. 11 includes the solenoids for the digit characters "1" to "8"; the second zone includes the digit character "9," the digit or letter character "O" and the letter characters "A" to "E"; the third zone includes the letter characters "F" to "K," and so forth; and selection of the respective zones is under the control of the zoning contacts $1b$ to $7b$ of the correspondingly numbered CR relays.

According to the code of Fig. 8, it will be seen, for example, that when said brush 27 senses a hole punched in the first index point of the column on a card being analyzed, a circuit will be established extending from the line conductor L (Fig. 10) through the contact roller 26, brush 27, conductor 70, the first contact of a rotating distributor wiper 71 (Fig. 11) operated in syncronism with the feed of the cards and with the wiper of distributor 39, the winding of relay CR1, the conducting segment $a$ of the commutator CM also rotated in timed relation to the card feed, and then to the other line conductor L1. Relay CR1 energizes in this circuit and locks up through its front contact $1a$, and remains in this condition as long as the brushes of commutator CM engage the segment $a$ which is throughout the duration of the complete sensing of the card column. The energization of relay CR1 also closes its zone contact $1b$ and thus it is determined that the solenoid CH representing the desired character to be printed is located in the first of the zones above described. Now assuming that the second index point in the card column is punched, thus indicating that the digit "1" is to be printed in accordance with the code of Fig. 8, it will be apparent that when the distributor wiper 71 engages its second contact, the winding of the register relay CR2 will be energized through the second punched index point the same as in the previously described circuit and will lock up through its front contact $2a$. Energization of said relay also closes its front contact $2c$ which is connected to the winding of the solenoid CH representing the digit "1." Said solenoid will now be energized over a circuit extending from the line conductor L through the conductor 72, the closed contacts $1b$ and $2c$, the winding of said solenoid, the conductor 73, and the segment $a$ of commutator CM to the line conductor L1, in preparation for a printing operation which occurs after complete analysis of a card. Said solenoid and the operated register relays CR remain energized as long as the brushes of the commutator CM are bridged by the segment $a$ and when this is no longer so the solenoid and relays release in preparation for the next cycle of operation. As another example, let it be assumed that it is desired to energize the solenoid CH representing the digit or letter "O." This solenoid is located in the second zone and the code for said character is represented by punchings at the second and fourth index point positions in the card column. Therefore, when the first hole in the column is sensed the relay CR2 will be first energized and locked up in a manner which is now obvious and its zoning contact $2b$ will be closed, thus selecting the second zone in which the desired solenoid CH appears. Thereafter, the register relay CR4 will be energized and locked up with the result that its front contact $4c$ will be closed to establish a circuit from the line conductor L over the conductor 74, the closed contacts $2b$ and $4c$, the winding of the solenoid CH representing "O," the conductor 73 and the commutator segment $a$ to the line conductor L1.

When the solenoid CH for any character is energized it will operate its bus bar 68 (Fig. 14) to close its various contacts 69 to thereby prepare circuits for the solenoids S individual to said contacts, which circuits extend from the line conductor L through the various contacts 69 to the windings of their respective solenoids S which are connected to the common conductor 75 leading to one of the brushes of the commutator CM which also has a conducting segment $b$, the other brush of said commutator being connected to the line conductor L1. The various solenoids S for which circuits have been prepared are not energized until said brushes of the commutator are bridged by the segment $b$ to close said circuits, and this action takes place after the entire card column has been analyzed and just before the segment $a$ (Fig. 11) breaks the holding circuits for the register relays CR. When the circuits are closed for the various solenoids S through the commutator segment $b$, all said solenoids are operated simultaneously to actuate the printing elements or wires 46 thereof so as to form the desired character in the manner previously described, and this action is true of all the printing heads 40 in the print section P. Thus it will be seen that with the heads 40 of the print section arranged in three rows, as in the example shown, the analysis of each card will result in the printing of three lines upon a dick strip simultaneously and, of course, it is obvious that the number of lines to be printed may be varied at will.

The operation will now be described which involves the rejection of a card when the subscription date punched therein compares with the set-up in the switching device A. For this operation, reference is made to Figs. 9, 10 and 12 from which it will be seen that the line conductor L will be connected to the conductors 76, 77, 78 and 79 as the four lower sensing brushes 27 successively encounter holes punched in their respective card columns, and that said conductors are connected, respectively, to the windings of relays in the various groups E, F, G and H (Fig. 9). However, circuits will not be completed to energize these relays unless the contact brushes 37, 38 of the device A are set to bridge the D and R segments individual to said relays and unless circuits through said brushes 37, 38 in all four of said relay groups are established, thus showing a comparison between the date read off the card 22 with the date set up in said device A; otherwise, no reject operation will occur and the sensed card will be fed through the guide 31 (Fig. 1) in its normal position, and into the pocket 29.

According to the described set-up of Fig. 9 for the date 12/48, successive sensing of the first and second holes in the first column of the card, identifying the digit "1," connects the line conductor L through the conductor 76 to the windings of relays E1 and E2, and the circuits are extended, respectively, through the segment 1R, brush 38 and segment 1D, and the segment 2R, brush 37 and segment 2D. When the wiper of the distributor 39 (Fig. 10), rotating in timed relation to the feed of the card, successively engages its first two contacts, energizing circuits for said relays E1, E2 will be closed over the conductors 80 and 81 and through the distributor 40 to the line conductor L1. Energization of said relays closes locking circuits therefor through their respective front contacts 1e, 1f and 2e, 2f to the common conductor 82 connected to the line conductor L1 through the segment c of the distributor CM (Fig. 10) and said relays remain energized until contact is broken at said commutator which occurs immediately after analysis of the last index points in the card columns. Whenever the readings of the remaining three brushes 27 connected to the conductors 77, 78 and 79 compare with the settings of the switch A associated with the relay groups F, G and H, two relays in each group are energized and locked up in a manner which is now apparent. Therefore, if the date 12/48 is sensed in a card, the pairs of relays E1, E2; F1, F3; G1, G5; and H1, H9 will be energized and locked. The energization of said pairs of relays is designed to energize, respectively, the relays E10, F10, G10 and H10 (Fig. 12) each of which is individual to one of the relay groups E to H and all of which are provided, respectively, with front contacts e10 to h10 which are adapted for connection in series to the winding of the solenoid 33, also shown in Fig. 1, when all four of the relays E10 to H10 are energized, that is, when the date punched in a card compares with the setting of switching device A. In order to energize said relays E10 to H10, the relays of each of the groups E to H are provided, as shown in Fig. 12, with front contacts in addition to those shown in Fig. 9 and for each of said groups there are provided, as for example in the E group, two zoning contacts 3e and 4e controlled by the relays E1 and E2 of said group. The contact 3e is connected in parallel to a group of contacts including an additional contact 5e of relay E2 and contacts 6e to 12e of the relays E3 to E9, respectively, and the contact 4e is similarly connected to a group of two contacts 13e and 14e which are additional contacts of relays E3 and E4. The groups of contacts shown connected to relays F10 to H10 are similarly arranged. Thus it appears that when relay E1 is energized by the sensing of the first hole in the first column of a card, the contact 3e of said relay is closed to select the group of contacts 5e to 12e, and when relay E2 is energized by the sensing of the hole in the second position of said column, the contact 5e of the latter relay will close, thereby establishing an obvious circuit across the line conductors L, L1 for the energization of relay E10 and consequent closure of its contact e10. If, for example, the first hole encountered by a brush 27 is punched in the second index point position, relay E2 would be first energized, closing its contact 4e and thereby selecting the second group of contacts 13e, 14e. The contact 5e in the first group would also close but this would have no effect since relay E1 is not energized and its contact 3e is not closed. The impulse occasioned by the sensing of the third or fourth digital position in the card column, respectively identifying the digit 9 or 0 (see Fig. 8), would then close either the contact 13e or 14e of the relay E3 or E4, and again the relay E10 would be energized through the contact 4e and either of the contacts 13e or 14e. From the foregoing, it will be apparent how the remaining groups of contacts control the energization of relays F10, G10 and H10 and it will be now obvious that in order for the solenoid 33 to be energized to thereby actuate the guide 31 by swinging the same upwardly and thus cause deflection of a card into the reject pocket 30, all four of said relays E10 to H10 must be energized and their respective contacts e10 to h10 closed; otherwise the guide 31 will remain in its normal position and the sensed card will pass into the pocket 29 to be used again for the mailing of future issues.

Figure 13:
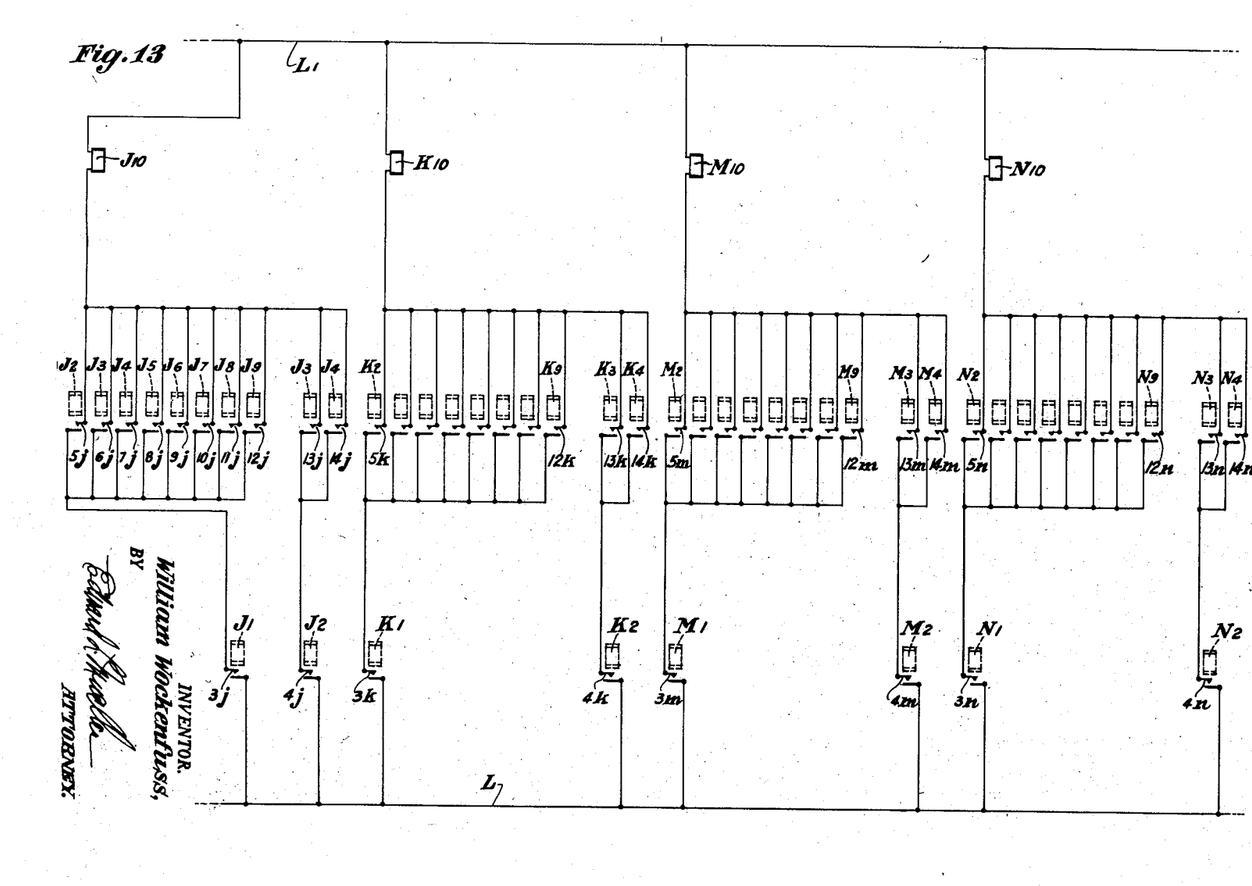

Operation of the print section P1 simultaneously with that of the section P, which occurs when the data punched in a card compares with the set-up in the switching device B, will now be described. With said switching device set up for the date 02/49, and with the brushes 27 sensing the holes in the first four columns of a card corresponding to said date, circuits will be extended over the conductors 76 to 79 to the relay groups J, K, M and N, whereupon the sets of relays J2 and J4, K1 and K3, M1 and M5 and N2 and N3 will be energized, respectively, through the bridged segments 2R, 2D and 4R, 4D of the J groups, segments 1R, 1D and 3R, 3D of the K group, 1R, 1D and 5R, 5D of the M group, 2R, 2D and 3R, 3D of the N group, and through the distributor 39 in the same manner as described in connection with the switching device A; and the energized relays are locked up over the common conductor 82 and segment c of the commutator CM. Energization of said sets of relays causes the relays J10, K10, M10 and N10 in the control circuit of Fig. 13 to be energized and these relays are provided with the series connected front contacts j10, k10, m10 and n10 of Fig. 15. Control of the relays J10, etc., is effected through front contacts of the relay groups J, K, M and N of Fig. 10 in the same manner as the E10 to H10 relays previously described. Thus, the J1 and J2 relays are provided with zoning contacts 3j and 4j which are in parallel with the two groups of contacts 5j to 12j and 13j, 14j. This arrangement is repeated with respect to the K, M and N groups and no further description thereof is deemed necessary. It is now apparent that the closing of the zoning contact of either of relays J1 or J2, Q1 or K2, M1 or M2, N1 or N2 and the subsequent closure of one of the other contacts in the groups assigned to said zoning contacts will result in the energization of relays J10, K10, M10 or N10 served by the respective contact groups. Should all four of the latter relays be energized in the sensing of a card, indicating a comparison between the date punched in said card and the set-up in the switching device B, then the four contacts j10, k10, m10 and n10 will be connected in series, and the circuits closed for the various solenoids S of the print section P by the contacts 69 of the character relays CH will be extended over the conductors 84 (Figs. 14 and 15) through the rectifiers conventionally indicated at 85 to solenoids S1 corresponding to solenoids S, the common conductor 86, contacts j10, k10, m10 and n10, conductor 87, and the segment b of commutator CM to the line conductor L1. As a result of the closing of these circuits, corresponding solenoids S and S1 in the two print sections will be energized simultaneously to produce a printing of the same character by the printing head 40 in each section. Upon disengagement of the segment b of the commutator CM from its brushes, the various circuits above described will be opened and the parts will restore to normal in preparation for the next card analysis.

What is claimed is:

1. In combination, two print sections capable of simultaneously printing a multiplicity of lines on two separate surfaces and each section comprising a number of printing heads arranged to print said lines, each said head including a plurality of printing elements each selectively operable in combination with others of said head to form any one of a plurality of different characters, analyzing means for punched cards, means controlled by said analyzing means to select like printing elements in both said print sections, means to thereupon operate the selected elements of one print section to print a plurality of lines simultaneously on one of said surfaces each time a card is analyzed, switching means settable in accordance with data punched in certain of said cards, and means cooperating with said switching means to operate the selected printing elements of the second print section to print a plurality of lines simultaneously on the other surface only when said data punched in a card compares with the setting of said switching means.

2. In a printing machine wherein punched cards normally follow a given path to a receiving station after being analyzed, the combination of two print sections adapted for interconnection, card analyzing means cooperating with said sections, means controlled by said analyzing means to operate one of said print sections each time a card is analyzed, two switching devices each including adjustable data identifying means set differently from the means of the other device, means jointly controlled by said analyzing means and the data identifying means in one of said switching devices for causing an analyzed card to follow a path other than said given path to a second receiving station when the data on said card analyzed by said analyzing means compares with the identifying means in the mentioned switching device, and means also jointly controlled by said analyzing means and the identifying means of the other switching device to interconnect said print sections for dual operation under the control of said analyzing means when the analyzed data in a card compares with the identifying means of said other switching device.

3. In a printing machine wherein punched cards normally follow a given path to a receiving station after being analyzed, the combination of two print sections adapted for interconnection and each including a multiplicity of print heads each having a plurality of printing elements individually and selectively operable in combination with others of said head to form any one of a plurality of different characters, card analyzing means cooperating with said sections to select a like combination of printing elements in the heads of both sections, means controlled by said analyzing means to operate the selected printing elements in the heads of one of said print sections each time a card is analyzed and to operate the selected elements of the print heads of both sections only when they are interconnected, two switching devices each including adjustable data identifying means set differently from the means of the other device, means controlled by the identifying means in one of said switching devices to cause an analyzed card to follow a path other than said given path to a second receiving station when the analyzed data on said card compares with the identifying means in the mentioned switching device, and means controlled by the identifying means of the other switching device to interconnect said print sections for dual operation when the analyzed data of a card compares with the identifying means of said other switching device.

4. In a printing machine wherein punched cards follow divergent paths after being analyzed, the combination of a print section including a print head having a multiplicity of printing elements each forming a portion of a character to be printed and selectively operable in combination with others of said head to form any one of a plurality of different complete characters, card analyzing means cooperating with said print section, means to feed cards past said analyzing means and along one or the other of said divergent paths, means controlled by said analyzing means as the cards are fed past the latter to select a combination of said printing elements, means controlled by said selecting means to operate the selected elements each time a card is analyzed, a switching device connected to said analyzing means and including adjustable data identifying means settable in accordance with data in certain cards to be analyzed, and means jointly controlled by said analyzing means and said switching device when the data in a card compares with the setting of said identifying means for directing said card along one of said paths and for directing the card along the other path when non-comparison exists between said data and said identifying means.

5. In combination, two print sections adapted for interconnection and each including a multiplicity of print heads each having a plurality of printing elements individually and selectively operable in combination with others of said head to form any one of a plurality of different characters, card analyzing means cooperating with said print sections, means controlled by said analyzing means to select for operation a like combination of printing elements in the heads of each section, means to operate the selected elements in the heads of one of said print sections each time a card is analyzed and to operate the selected elements in the heads of both said sections only when they are interconnected, a switching device connected to said analyzing means and including adjustable data identifying elements settable in accordance with data punched in certain cards being analyzed, and means controlled by said switching device for interconnecting said print sections for dual operation only when the setting of said identifying elements compares with the data punched in one of said cards.

6. In an addressing machine, two print sections one of which is normally disabled and each being adapted to print on a surface of a different sheet, means to feed a separate sheet to each section, record analyzing means, means controlled therefrom each time a record is analyzed for periodically operating one of said print sections to the exclusion of the other to print complete characters on the surface of only one of said sheets, a switching device connected to said record analyzing means and including adjustable data identifying elements settable in accordance with data appearing in certain records being analyzed, and means controlled by said switching means, only when the setting of said identifying elements compares with data in said certain records, to render operative said normally disabled print section to print on the surface of the other of said sheets.

7. In an addressing machine, two print sections one of which is normally disabled and each being adapted to print on a surface of a different sheet, means to feed a separate sheet to each section, record analyzing means, means controlled therefrom each time a record is analyzed for periodically operating one of said print sections to the exclusion of the other to print complete characters on the surface of only one of said sheets, a switching device connected to said record analyzing means and including a plurality of data identifying elements manually settable to positions corresponding to data appearing in certain records being analyzed, and means controlled by said switching means, only when the setting of said identifying elements compares with data in said certain records, to render operative said normally disabled print section to print on the surface of the other of said sheets.

8. In an addressing machine, two normally disconnected print sections each capable of printing on a surface of a different sheet the characters represented by a combinational code in records being analyzed, means to feed a separate sheet to each print section, record analyzing means, means controlled by said analyzing means for operating only one of said print sections periodically to print characters in accordance with analyzed records on the surface of one of said sheets, normally inoperative means to interconnect said print sections for dual operation by said controlled means; said interconnecting means comprising a switching device manually settable to establish predetermined connections therein comparable with a code in certain of the records being analyzed, and means controlled by said connections and operable when said predetermined connections compare with said code to render effective said interconnecting means; and means also controlled by said analyzing means and operable only in response to the analysis of a predetermined code in a record being analyzed to operate said interconnecting means to effect printing on the other of said sheets by the second print section.

9. In an addressing machine, two normally disconnected print sections each capable of printing on a surface of a different sheet the characters represented by a combinational code in records being analyzed, means to feed a separate sheet to each print section, record analyzing means, means controlled by said analyzing means for operating only one of said print sections periodically to print characters in accordance with analyzed records on the surface of one of said sheets, normally inoperative means to interconnect said print sections for dual operation by said controlled means; said interconnecting means comprising a switching device manually settable to establish predetermined connections therein comparable with a code in certain of the records being analyzed, a plurality of normally open contacts between said print sections and adapted to be joined in series, and circuit means controlled by the connections in said switching device and operable when said connections compare with said code for closing said contacts in series; and means also controlled by said analyzing means and operable only in response to the analysis of a predetermined code in a record being analyzed to operate said interconnecting means to effect printing on the other of said sheets by the second print section.

WILLIAM WOCKENFUSS.

References Cited in the file of this patent

UNITED STATES PATENTS

| Number | Name | Date |
| --- | --- | --- |
| 1,028,037 | Lilleberg | May 28, 1912 |
| 1,608,145 | Tingley | Nov. 23, 1926 |
| 1,691,889 | Meisel | Nov. 13, 1928 |
| 1,717,231 | Krell | June 11, 1929 |
| 2,077,962 | Smith | Apr. 20, 1937 |
| 2,120,233 | Daly | June 14, 1938 |
| 2,129,065 | Loop | Sept. 6, 1938 |
| 2,141,577 | Watson | Dec. 27, 1938 |
| 2,282,067 | Lang | May 5, 1942 |
| 2,353,083 | Roth | July 4, 1944 |
| 2,359,680 | Roth | Oct. 3, 1944 |
| 2,359,855 | Gruver | Oct. 10, 1944 |
| 2,412,527 | Mills | Dec. 10, 1946 |

FOREIGN PATENTS

| Number | Country | Date |
| --- | --- | --- |
| 523,698 | Germany | Aug. 21, 1933 |